Figure 1:
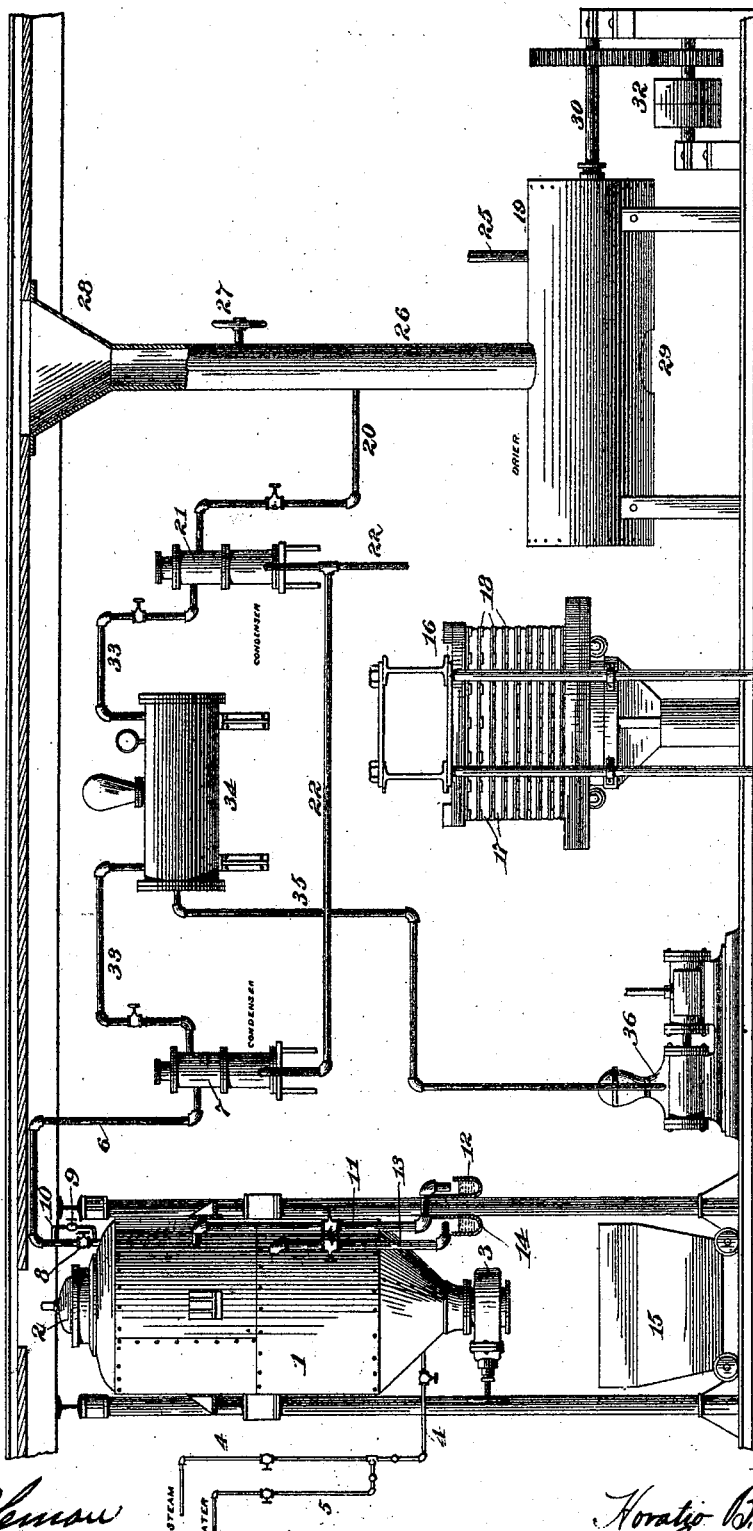

(No Model.) 2 Sheets—Sheet 1.

H. B. ARNOLD.
PROCESS OF DISPOSING OF CITY GARBAGE.

No. 501,037. Patented July 4, 1893.

Witnesses.
Inventor
Horatio B. Arnold (No Model.) 2 Sheets—Sheet 2.

H. B. ARNOLD.
PROCESS OF DISPOSING OF CITY GARBAGE.

No. 501,037. Patented July 4, 1893.

Witnesses.
J. F. Coleman
Will E. Neff

Inventor
Horatio B. Arnold
By J. A. Watson
Att.

UNITED STATES PATENT OFFICE.

HORATIO B. ARNOLD, OF BOSTON, MASSACHUSETTS.

PROCESS OF DISPOSING OF CITY GARBAGE.

SPECIFICATION forming part of Letters Patent No. 501,037, dated July 4, 1893.

Application filed November 8, 1892. Serial No. 451,330. (No specimens.)

*To all whom it may concern:*

Be it known that I, HORATIO B. ARNOLD, a citizen of the United States, residing at Boston, in the county of Suffolk and State of Massachusetts, have invented certain new and useful Improvements in Methods of and Apparatus for Treating Garbage, of which the following is a specification.

My invention relates to a new method of treating city garbage.

The material which it is designed to treat by my invention is commonly called garbage and consists of waste vegetable and animal matter, principally vegetable, from the kitchens of private houses and hotels. Garbage accumulates rapidly and must be removed frequently to prevent it from becoming offensive and dangerous to the public health. The question of the disposal of the large quantities of garbage produced in cities and towns is a very important one and so far as I am aware no hygienic and economical system of its disposal has heretofore been devised. In many large cities it is still customary to collect garbage and dump it in adjoining waters or upon the surface of the ground in the surrounding country. In either case a nuisance is created and the public health endangered. Even when dumped out at sea this method of disposing of garbage is objectionable for the reason that much of it floats and is soon washed ashore. Another way of disposing of garbage is to treat it with chemicals in order to destroy all disease germs and prevent the emanation of noxious gases. This process however is not commercially practical because of the great expense for chemicals and apparatus necessary to carry it on. By my improved method of treatment garbage is reduced to a dry and practically inodorous substance which is valuable as a fertilizer; and, without the use of chemicals, I prevent the escape of any noxious vapors or odors during the treatment. On account of its sanitary perfection my method can be carried on within or close to cities or towns, thus saving the expense of transportation to distant points; and on account of its cheapness and the value of the resulting products it renders garbage a valuable commodity instead of a public nuisance as heretofore.

Briefly stated, my method of treatment consists in first cooking the garbage thoroughly in a closed tank or digester and leading the vapors to a condenser so that none may be permitted to escape; secondly in pressing the cooked garbage in a powerful press and thereby eliminating most of the water, and lastly in drying the material in a closed drier and conducting the vapors which are formed in the drier to a condenser. The various steps in the process will be more fully described in connection with the apparatus which is illustrated in the accompanying drawings in which—

Figure 2:
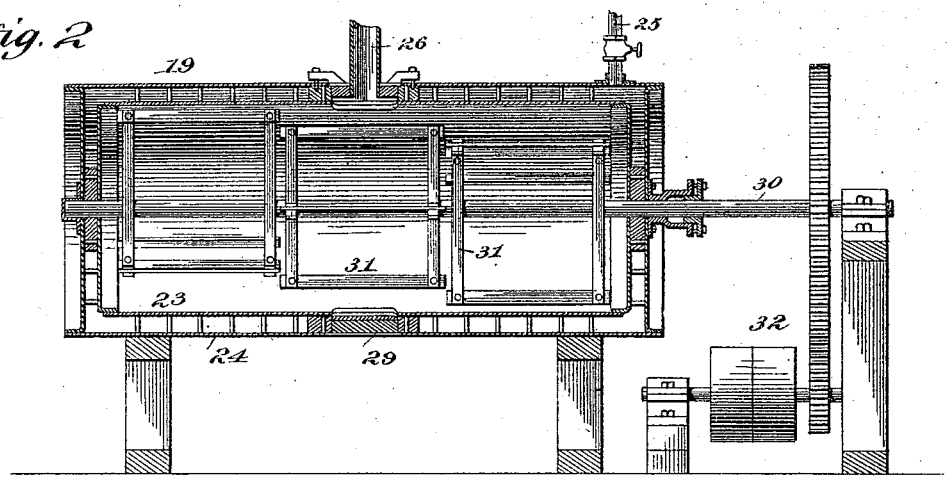
Figure 3:
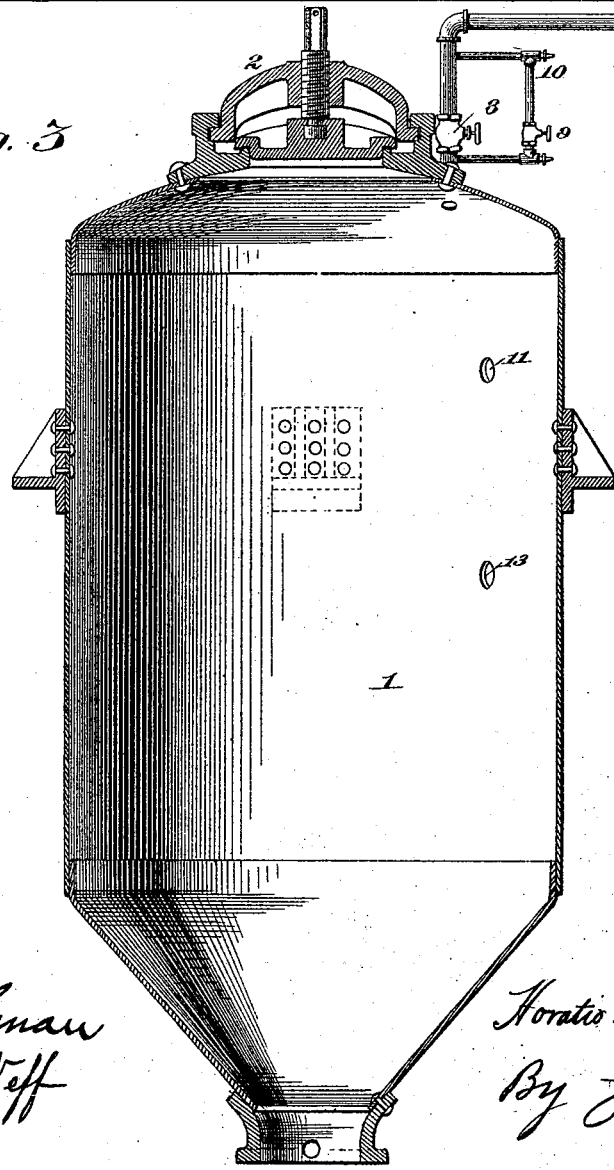

Figure 1 shows in side elevation all of the apparatus. Fig. 2 is a longitudinal sectional view of the drier shown in Fig. 1, and Fig. 3 is a central sectional view of the digester.

The garbage in the condition in which it is collected is placed in a digester 1 which is provided with a removable cover 2 at the top and an outlet valve 3 at its lower end. The digester is preferably cylindrical with a conical bottom although any other cooking vessel adapted to be closed steam tight might be substituted. Into the bottom of the digester steam is introduced through a pipe 4 and, for a purpose to be presently explained, water may be admitted to the digester through a pipe 5 which, as shown in the drawings, is connected to the steam pipe to save the expense of an independent connection with the digester. When steam is admitted directly into the digester that which condenses by contact with the garbage furnishes sufficient water for the cooking operation. Enough garbage is placed in the tank to fill it from two-thirds to three-fourths full more or less and steam is admitted through the pipe 4. The escaping steam and vapors from the garbage are permitted to pass off through a pipe 6 which leads to a condenser 7. In order to get up the required amount of heat the main escape pipe 6 may be closed by a valve 8, but when the valve 8 is closed I open a valve 9 in a by-pass pipe 10 to prevent the pressure in the digester from becoming dangerously high.

The cooking operation I have found it preferable to carry on for a period of from four to eight hours, more or less time being required according to the nature of the garbage. If the ingredients are mostly animal matter less time is necessary to effect the cooking than if they are vegetable. After it is sufficiently cooked the grease which has been separated by the heat, and which floats on the top of the other ingredients, is tapped off through a pipe 11 into a trough or other receptacle 12. If there is any grease below the level of the entrance to the pipe 11 it may be raised to such entrance by shutting off the steam pipe 4 and admitting water under pressure through the pipe 5. After the grease has been tapped off the garbage is allowed to settle in the digester and the water is then run off through a pipe 13 into a suitable trough or receptacle 14. The cooked garbage, which I will now term "tankage," still contains a large percentage of moisture. It is removed from the digester through the valve 3 and conveyed by a car 15 or otherwise to a press 16. In the drawings I have illustrated a hydraulic press but it will be understood that any other suitable form may be adopted. The tankage is placed in cloths 17 between racks 18 and submitted to heavy pressure which expresses a large percentage of the remaining fluid and thus renders the drying operation economical and rapid. The tankage as it comes from the press is placed in a closed drier 19 having a connecting pipe 20 leading into a condenser 21 whereby all of the vapors from the drier are condensed and discharged in liquid form through the waste pipe 22. As shown, the drier consists of an inner cylinder 23 and a surrounding steam jacket 24, the intervening space being supplied with steam through a pipe 25. Extending from the upper side of the drier is a pipe 26 having a valve 27 and a funnel-shaped top 28 into which the tankage is dumped. The valve 27 is opened when the drier is being charged and kept closed at other times to prevent any of the vapors from the drier from escaping into the atmosphere. The pipe 20 as shown is connected to the charging pipe 26 below the valve 27. At the bottom of the drier is a discharge opening, closed by a suitable lid 29, through which the dried tankage is removed. A shaft 30 passes through the drier and carries stirring arms 31 which keep the material agitated and facilitate the drying. The shaft is rotated by suitable gearing and pulleys 32. The tankage may be elevated and conveyed from the press to the drier by any suitable means. As shown the funnel 28 for charging the drier is attached to the floor above and the tankage must be raised to this floor after being pressed. By shortening the pipe 26 so that the funnel 28 would be only a short distance above the drier the tankage may be shoveled directly from the press into the funnel. The means for handling the material does not form a part of my present invention and a detailed description of it may therefore be omitted. The cold water is supplied to the condensers through pipes 33 which are connected to a water main or any other suitable source of supply. As shown they are connected to a pressure tank 34 which is supplied through a pipe 35 by a pump 36.

The various steps in the process are indicated in the above description of the apparatus and it will not be necessary to repeat them.

An important feature of the invention is that the cooking of the garbage thoroughly sterilizes it so that the vapor which is driven off, when condensed, takes the form of water which is free from any dangerous properties and practically without odor. This water of condensation and also the water from the press may be run directly into city sewers or into adjoining streams without affecting their sanitary condition.

I am aware that in treating animal matter it is not new to remove the noxious gases and pass them through a furnace, to separate the solid from the liquid portions, and to pass the gases from the residuum also through a furnace; also that it is old to superheat and burn the gases from such material. But I am not aware that the operations herein described have been performed upon city garbage.

What I claim, and desire to secure by Letters Patent, is—

1. The improved sanitary process of disposing of city garbage and recovering useful products therefrom which consists in first cooking the garbage in a closed vessel for a period of from four to eight hours, more or less according to the nature of its ingredients, and condensing all vapors which pass off during the cooking operation; then separating the solid matter or tankage from the water and grease; then pressing the tankage to separate an additional quantity of water; and then drying the tankage in a closed drier and condensing the vapors thus produced, substantially as described.

2. The improved sanitary process of disposing of city garbage and recovering useful products therefrom which consists in first subjecting the garbage to the direct action of steam in a closed vessel for a period of from four to eight hours, more or less according to the nature of its ingredients, and condensing all the vapors which pass off during the cooking operation; then drawing off separately the grease which arises to the top, the solid matter or tankage at the bottom, and the intermediate water; then subjecting the tankage to pressure to separate an additional quantity of water; and then drying the tankage from the presses in a closed drier and condensing the vapors thus produced, substantially as described.

In testimony whereof I affix my signature in presence of two witnesses.

HORATIO B. ARNOLD.

Witnesses:
JAMES A. WATSON,
W. CLARENCE DUVALL.